US007005602B1

(12) United States Patent
Howell

(10) Patent No.: US 7,005,602 B1
(45) Date of Patent: Feb. 28, 2006

(54) METHOD AND SYSTEM FOR LASER MARKING AN ARTICLE

(75) Inventor: Robert P. Howell, San Jose, CA (US)

(73) Assignee: Exatron, Inc., San Jose, CA (US)

( * ) Notice: Subject to any disclaimer, the term of this patent is extended or adjusted under 35 U.S.C. 154(b) by 130 days.

(21) Appl. No.: 10/788,560

(22) Filed: Feb. 27, 2004

(51) Int. Cl.
*B23K 26/00* (2006.01)

(52) U.S. Cl. .............................. 219/121.69; 219/121.78

(58) Field of Classification Search ............. 219/121.6, 219/121.61, 121.62, 121.65–121.72, 121.78, 219/121.82, 121.83
See application file for complete search history.

(56) References Cited

U.S. PATENT DOCUMENTS

| 5,408,083 A | * | 4/1995 | Hirukawa et al. | ....... 250/201.2 |
| 5,721,605 A | * | 2/1998 | Mizutani | ...................... 355/53 |
| 6,094,410 A | * | 7/2000 | Fan et al. | ...................... 369/94 |
| 6,211,484 B1 | * | 4/2001 | Kaplan et al. | ......... 219/121.68 |
| 6,649,863 B2 | * | 11/2003 | Teoman et al. | ........ 219/121.68 |

* cited by examiner

*Primary Examiner*—Samuel M. Heinrich
(74) *Attorney, Agent, or Firm*—Blakely, Sokoloff, Taylor & Zafman; Stephen M. De Klerk

(57) ABSTRACT

A method of marking an article is described. A laser beam is generated. A position of a focal point of the laser beam is detected with a CCD detector that is in a predetermined position relative to a frame. The detector is then moved out of a plane of the focal point. An article is then held by a holder that is in a predetermined position relative to the frame, so that a marking surface of the article is in the plane. The laser beam is then directed onto the marking surface of the article, and the focal point is moved relatively across the marking surface. The position of the focal point on the marking surface is based on both the data set and reference position. The reference position may, for example, be deducted from factory calibration data to obtain modified calibration data, and the modified calibration data may be used to control the laser beam.

7 Claims, 5 Drawing Sheets

| PC 18 | Control Module 30 |
|---|---|
| 1) Factory Calibration Data<br>2) Vector Set of Desired Pattern | 1) Factory Calibration Data |
| 1) Factory Calibration Data<br>2) Vector Set of Desired Pattern<br>3) x1;y1 | 1) Factory Calibration Data |
| 1) Factory Calibration Data<br>2) Vector Set of Desired Pattern<br>3) x1;y1<br>4) Modified Calibration Data (Factory Calibration Data -(x1;y1)) | 1) Factory Calibration Data |
| 1) Factory Calibration Data<br>2) Vector Set of Desired Pattern<br>3) x1;y1<br>4) Modified Calibration Data | 1) Modified Calibration Data<br>2) Vector Set of Desired Pattern |

FIG. 3

METHOD AND SYSTEM FOR LASER MARKING AN ARTICLE

BACKGROUND OF THE INVENTION

1). Field of the Invention

This invention relates generally to a method and system for laser marking an article, and more specifically to a manner according to which the system is calibrated and used.

2). Discussion of Related Art

Laser marking systems are often used to mark articles with desired patterns before being shipped to a customer. Such a pattern may, for example, be the name of a manufacturer or a serial number.

A laser marker system usually has a frame, a laser, a galvo head, and an article holder, mounted to the frame. The laser generates a laser beam that is directed through the galvo head onto a marking surface of an article that is held by the holder. The galvo head has mirrors and motors that can manipulate the laser beam so that a focal point thereof moves in x- and y-directions. A galvo head also has a processor and memory. A vector set of instructions is stored in the memory and is used by the processor to manipulate the mirrors to mark a desired pattern on the article.

Factory calibration data is also stored in the memory of the galvo head. The factory calibration data is created at a factory where the system is assembled. The galvo head is calibrated so that the focal point of the laser beam is at a reference position (x0;y0).

It has been found that the factory calibration data is not always sufficiently accurate for all purposes, or may also "shift" over a period of time due to tolerances that creep into the frame or the holder. As such, the reference focal point of the laser beam is not at the position (x0;y0) according to the factory calibration data, but instead at new position (x1;y1). A pattern marked on an article will, accordingly, be shifted from the position (x0;y0) according to the factory calibration data to the new position (x1;y1).

SUMMARY OF THE INVENTION

The invention provides a method of laser marking an article, including storing a data set including at least a vector set of a desired substantially two-dimensional pattern, detecting a position of a focal point of a laser beam on a two-dimensional area, storing the position, and directing the laser beam onto a marking surface of an article and moving the focal point relatively across the marking surface, a pattern being marked by the laser on the marking surface being based on both the data set and the reference position.

The method may include moving the detector away from a plane off the focal point, and positioning the article with the marking surface thereof in the plane.

The method may include calculating a difference between the reference position and a base position, the pattern being marked by the laser being based on the difference.

The method may include modifying the data set with the difference.

The vector set may be modified with the difference.

The data set may include calibration data for the laser, the difference being used to modify the calibration data.

The invention also provides a method of marking an article, including storing a data set including at least a vector set of a desired substantially two-dimensional pattern, generating a laser beam, detecting a focal point of a laser beam with at least one detector that is at a predetermined position relative to a frame, moving the detector out of a plane of the focal point, placing an article so that the article is held by a holder that is in a predetermined position relative to the frame so that a marking surface of the article is in the plane, and directing the laser beam onto the marking surface and moving the focal point freely across the marking surface, the position of the focal point on the marking surface being based on both the data set and the reference position.

The invention further provides a laser marker system, including a frame, a laser generating a beam with a focal point, at least one detector mounted to the frame and capable of detecting a reference position of the focal point relative to the frame, a memory to hold a data set of coordinates of a desired substantially two-dimensional pattern, a holder mounted to the frame to hold an article with a marking surface thereof in a predetermined position relative to the frame, directing apparatus to move the focal point relatively across the marking surface, and control apparatus utilizing both the data set and the reference position to control the directing apparatus and marking of the surface with the laser beam.

BRIEF DESCRIPTION OF THE DRAWINGS

The invention is further described by way of example with reference to the accompanying drawings, wherein:

FIG. 3 is a table illustrating data subsets that are stored in various memories of the system;

DETAILED DESCRIPTION OF THE INVENTION

Figure 1:
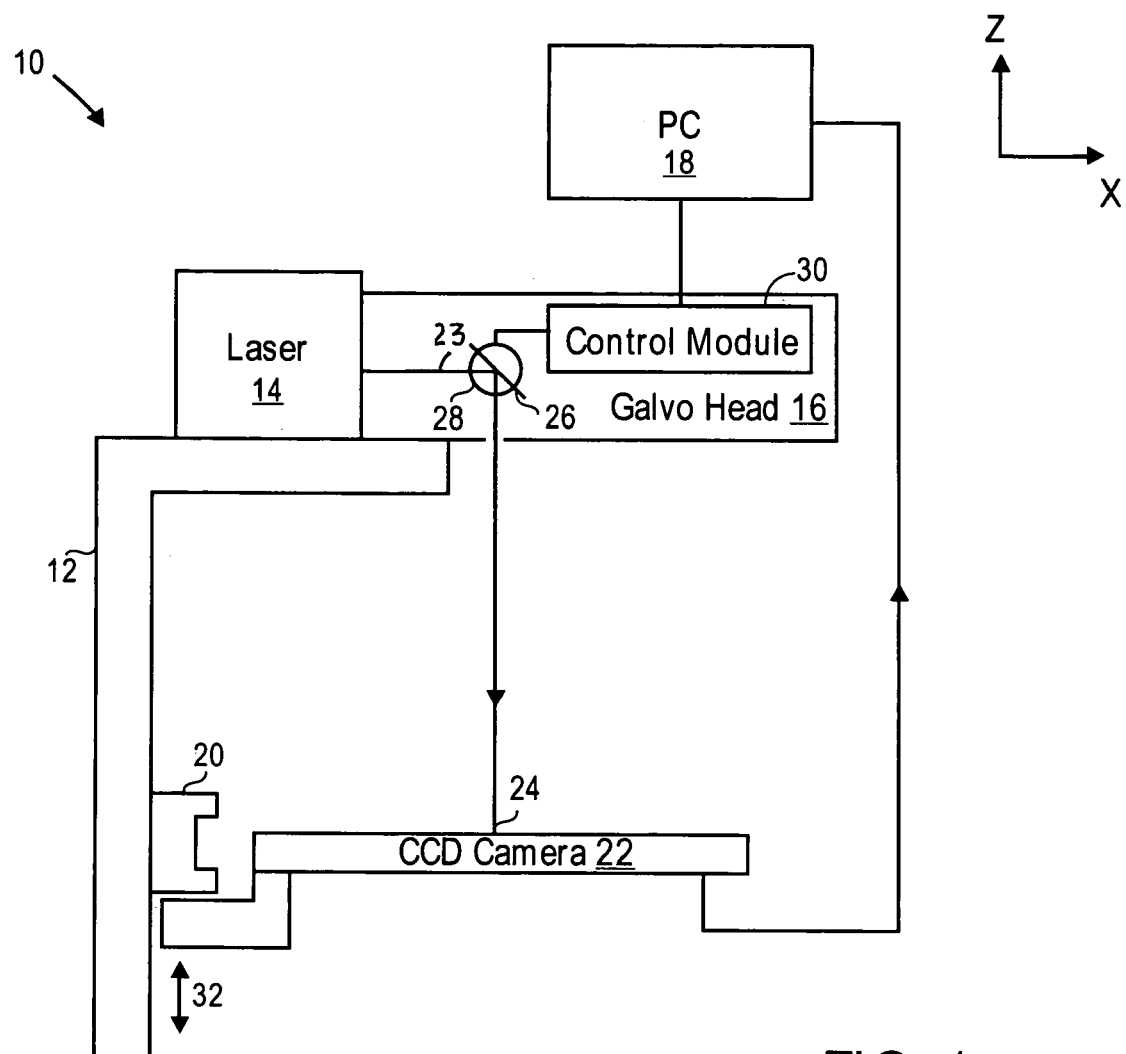
FIG. 1 is a side view of a laser marker system according to an embodiment of the invention.

FIG. 1 of the accompanying drawings illustrates a laser marker system 10 according to an embodiment of the invention, which includes a frame 12, a laser 14, a galvo head 16, a personal computer (PC) 18, a holder 20 for an article, and a charge couple device (CCD) camera 22.

The laser 14 is mounted in a fixed position relative to the frame 12. Lasers, per se, are known in the art and are not described in detail herein. Suffice to say that the laser 14 generates a laser beam 23 that passes through various mirrors and lenses and has a focal point 24.

The galvo head 16 is mounted in a fixed position relative to the laser 14. As illustrated, the galvo head 16 includes a mirror 26 located in a position where the laser beam 23 reflects therefrom. It should, however, be understood that the galvo head 16 may include a number of mirrors from which the laser beam 23 reflects, and that these mirrors are operable to move the focal point 24 in x- and y-directions. That mirror 26 is connected to a motor 28 that can be used to pivot the mirror 26 to cause movement of the focal point 24. Each one of the mirrors of the galvo head 16 may have a separate motor connected thereto.

The galvo head 16 also has a control module 30 to which the motor 28 and other motors of the galvo head 16 are connected. The control module 30 has memory in which a set of instructions can be stored, and a processor that can execute the instructions and control the motor 28 and other motors based on the set of instructions.

The PC 18 has its own memory, its own processor, one or more drives, and one or more input and output devices. A set of instructions can be located on a disk and be placed in the drive, from where the set of instructions can be loaded into the memory of the PC 18. An operator can also use the input/output device to create or modify the set of instructions in the memory of the PC 18. The PC 18 is connected to the control module 30 through a port on the galvo head 16.

The CCD camera 22 is mounted to the frame 12 and is movable in up and down z-direction 32. The CCD camera 22 has an array of detectors in an x-y plane. Each detector of the CCD camera 22 is capable of detecting when the focal point 24 is thereon. The CCD camera 22 is connected to the PC 18.

Figure 2:
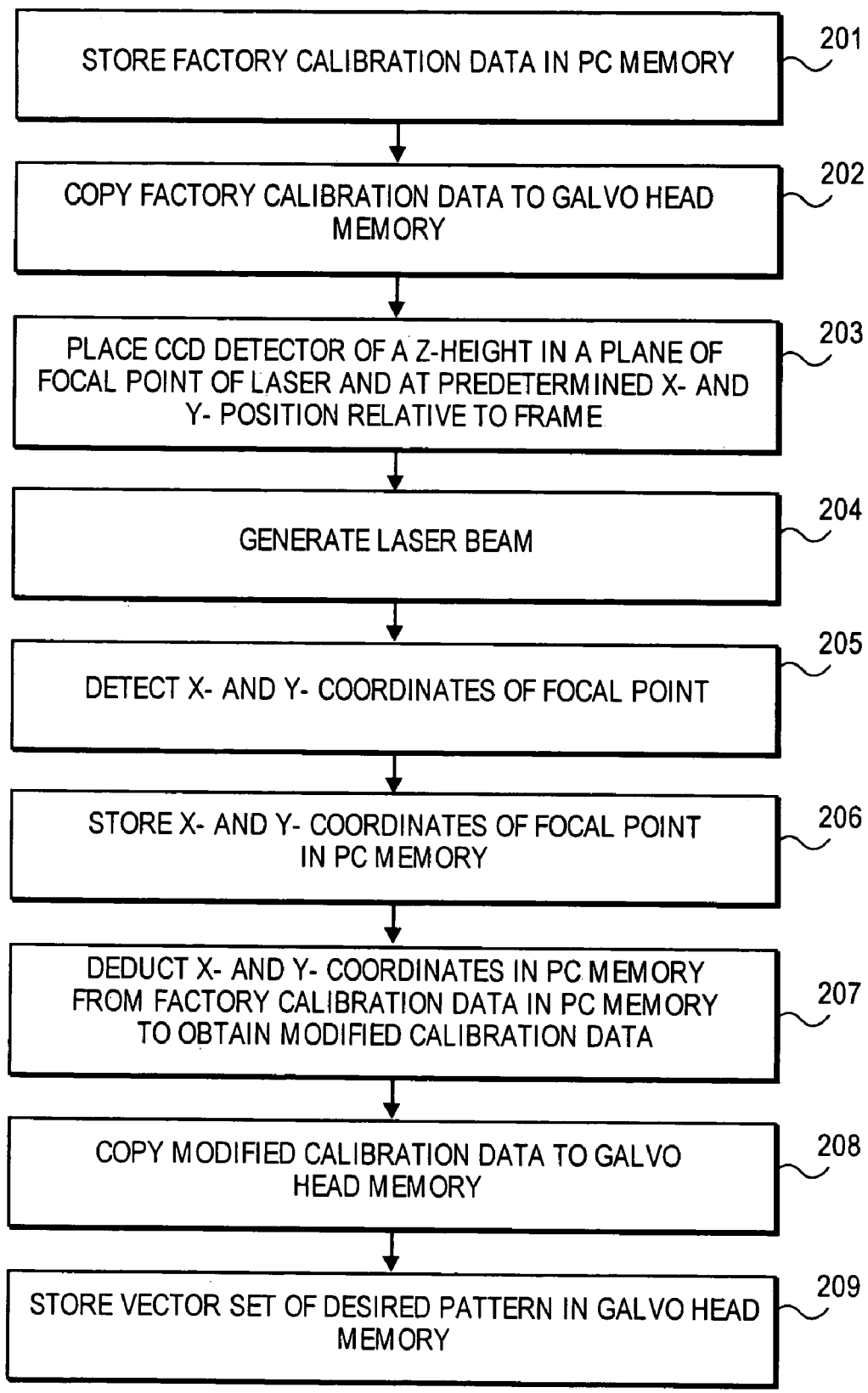
FIG. 2 is a flow chart illustrating how a memory of a control module of a galvo head of the system is calibrated.

As illustrated in FIGS. 2 and 3, the factory calibration data is initially stored in the memory of the PC 18. (Step 201 in FIG. 2; row 1 in FIG. 3.) The factory calibration data is then copied from the memory of the PC 18 into the memory of the control module 30 of the galvo head 16. (Step 202 in FIG. 2; row 1 in FIG. 3.) The factory calibration data is generated when the galvo head 16 is initially calibrated at a factory, and provides a rough indication of how and where a laser should be pointed to mark a surface of an article that is held by the holder 20. The factory calibration data is often not extremely accurate, and may shift over a period of time due to tolerances in the entire machine.

A vector set of a desired pattern is also present in the memory of the PC 18. (Row 1 in FIG. 3.) The vector set is a set of instructions of how a laser beam should move to mark a desired pattern on an article, and may, for example, be the name of a manufacturer, a serial number, etc. The vector set can be provided on a disk and be loaded via a drive into the memory of the PC. The vector set can be modified or be created by a user utilizing one or more of the input/output devices of the PC 18.

Next, the CCD camera 22 is moved so that the detectors thereof are in a plane of the focal point 24 of the laser beam 23. (Step 203 in FIG. 2.) The laser beam 23 is then generated. (Step 204 in FIG. 2.) One of the detectors of the CCD camera 22 then detects the x- and y-coordinates of the focal point 24. (Step 205 in FIG. 2.) The x- and y-coordinates of the focal point are then transmitted to the PC 18 and stored in the memory of the PC 18. (Step 206 in FIG. 2; row 2 in FIG. 3.)

Figure 4:
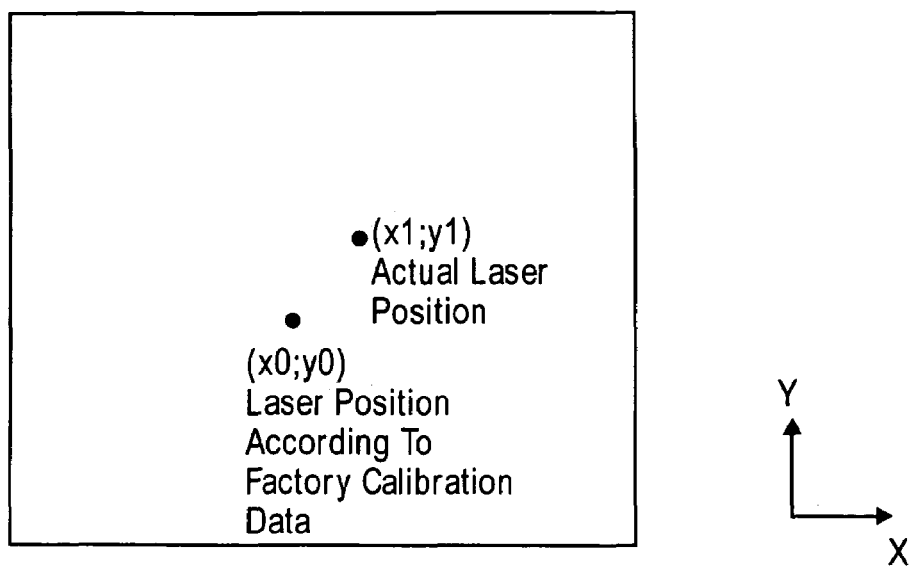
FIG. 4 is a plan view illustrating an actual laser position relative to a laser position according to factory calibration data.

As shown in FIG. 4, the actual laser position (x1;y1) is shifted in x- and y-directions relative to the laser position according to the factory calibration data (x0;y0). A pattern that is marked on an article would be shifted in a direction from the coordinates of the laser position according to the factory calibration data (x0;y0) to the actual laser position (x1;y1). Depending on the use of the mark that is created on an article, such a shift may be undesirable. The purpose of the steps that follow is to correct for the shift.

Referring again to FIGS. 2 and 3, the x- and y-coordinates of the actual laser position (x1;y1) are then deducted from the factory calibration data in the memory of the PC. (We will assume that the coordinates of the laser position according to the factory calibration data (x0;y0) is zero. That way, then, we simply deduct the actual laser position (x1;y1) from the factory calibration data. A more correct statement would be that we are deducting the difference ((x1;y1)−(x0;y0)) from the factory calibration data.) The result is a set of data, referred to as modified calibration data. (Step 207 in FIG. 2; row 3 in FIG. 3.)

The modified calibration data and the vector set are then copied from the memory of the PC into the memory of the control module 30. (Steps 208 and 209 in FIG. 2; row 4 in FIG. 3.) The galvo head 16 is now programmed correctly for marking a desired pattern in a desired position on an article.

Figure 5:
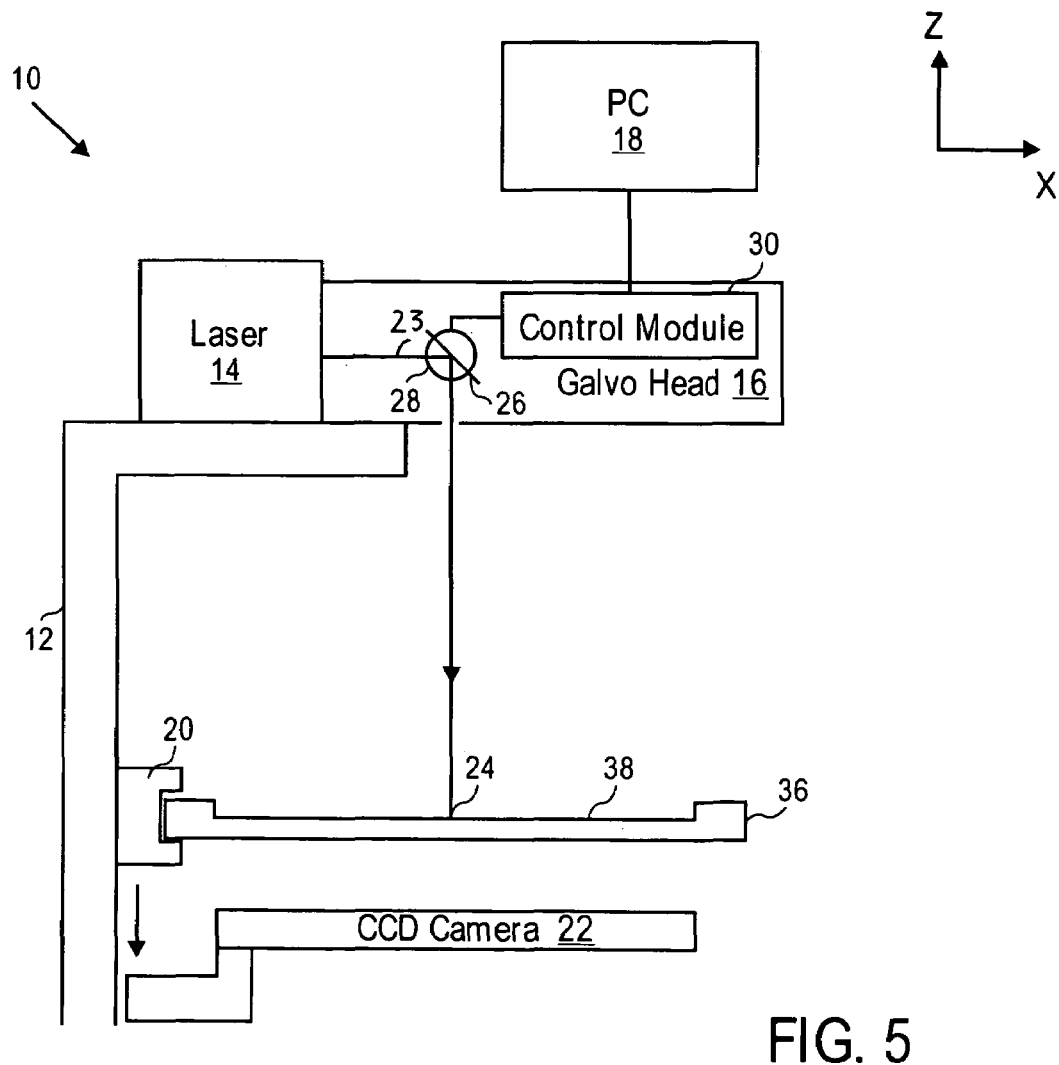
FIG. 5 is a view similar to FIG. 1 after a CCD camera of FIG. 1 is moved out of a plane of a focal point of a laser and a marking surface of an article is placed in the plane of the focal point of the laser.
Figure 6:
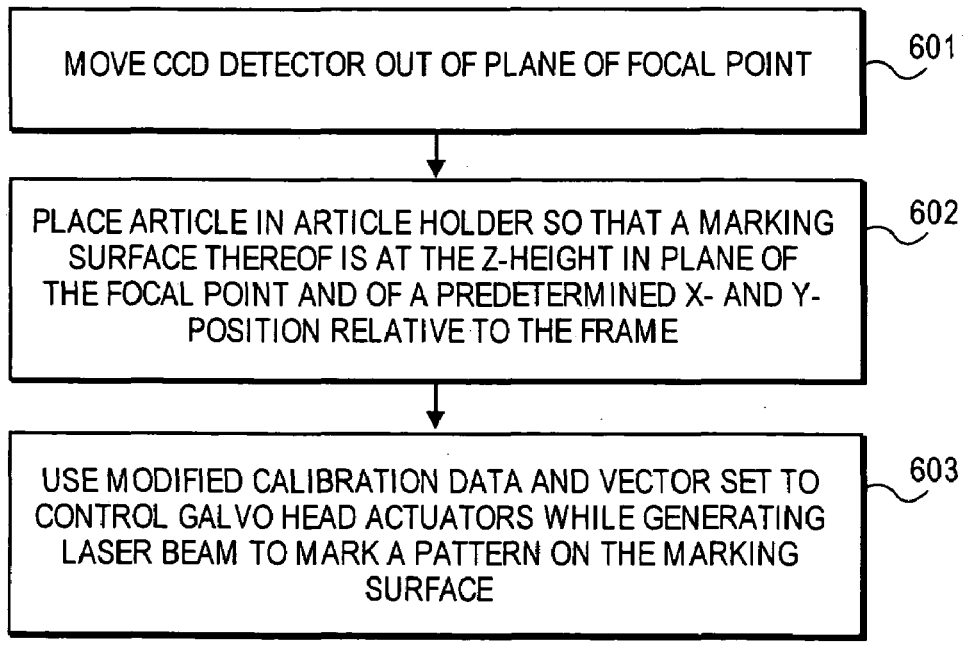
FIG. 6 is a flow chart illustrating how the system is operated after it has been calibrated.
Figure 7:
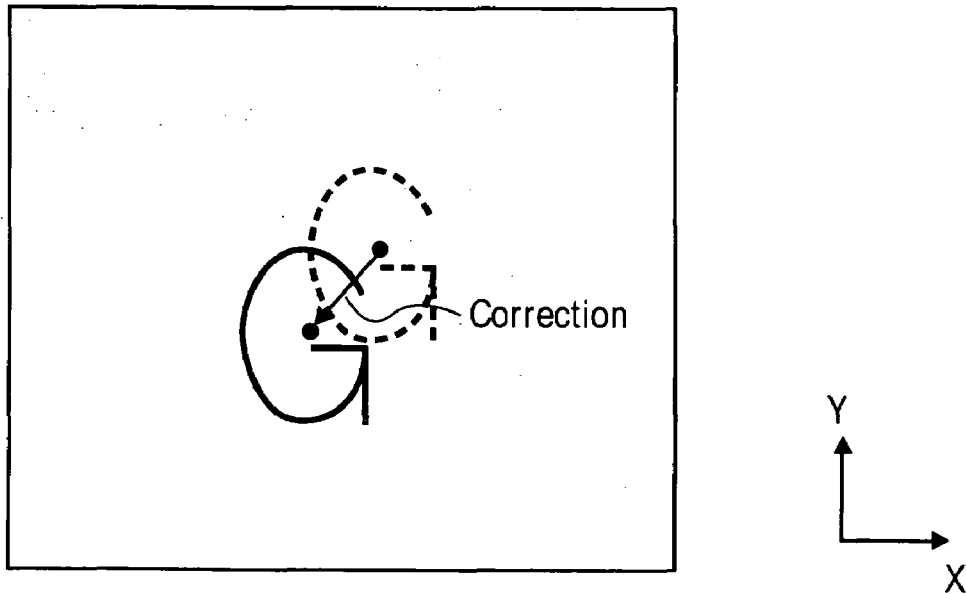
FIG. 7 is a plan view of a pattern that is marked on the marking surface of the article.

As illustrated in FIG. 5, the CCD camera 22 is moved downward out of a plane of the focal point 24. An article 36 is located in the holder 20. The holder 20 is mounted in a fixed position relative to the frame 12 so that a marking surface 38 of the article 36 is located in a plane of the focal point 24, and in a fixed and predetermined x- and y-position relative to the frame 12. (Steps 601 and 602 in FIG. 6.) The modified calibration data and the vector set, in the memory of the control module 30, are then used to move the focal point 24 in x- and y-directions and mark the desired pattern on the marking surface 38. FIG. 7 illustrates where a pattern (represented by the letter "G") would have been marked based on the factory calibration data and where the letter "G" is actually marked with the modified calibration data. The correction represented in FIG. 7 is equal in magnitude but opposite in direction to the shift represented in FIG. 4.

In the embodiment hereinbefore described, the factory calibration data is modified to obtain the modified calibration data. In another embodiment, the vector set may be modified by deducting the coordinates of the actual laser position (x1;y1) from the vector set to obtain a modified vector set. In each case, a data set, including the factory calibration data and the vector set, is modified by deducting the actual laser position (x1;y1).

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of laser marking an article, comprising:
   detecting a reference position of a focal point of a laser beam on a two-dimensional area;
   storing the reference position;
   calculating a difference between the reference position and a base position; and
   directing the laser beam onto a marking surface of an article and moving the focal point relatively across the marking surface, a pattern being marked by the laser on the marking surface being based on a data set, the reference position, and the difference between the reference position and the base position.

2. The method of claim 1, further comprising:
   moving the detector away from a plane of the focal point; and
   positioning the article with the marking surface thereof in the plane.

3. The method of claim 1, further comprising:
   modifying the data set with the difference.

4. The method of claim 1, wherein the data set includes at least a vector set of a desired substantially two-dimensional pattern, and the vector set is modified with the difference.

5. The method of claim 3, wherein the data set includes calibration data for the laser, the difference being used to modify the calibration data.

6. A method of marking an article, comprising:
    storing a data set including at least a vector set of a desired substantially two-dimensional pattern;
    generating a laser beam;
    detecting a focal point of a laser beam with at least one detector that is at a predetermined reference position relative to a frame;
    moving the detector relatively out of a plane of the focal point; and
    placing an article so that the article is held by a holder that is in a predetermined position relative to the frame so that a marking surface of the article is in the plane; and
    directing the laser beam onto the marking surface and moving the focal point relatively across the marking surface, the position of the focal point on the marking surface being based on both the data set and the reference position.

7. A method of laser marking an article, comprising:
    detecting a reference position of a focal point of a laser beam on a two-dimensional area of a detector;
    storing the reference position;
    moving the detector away from a plane of the focal point;
    positioning an article with a marking surface thereof in the plane; and
    directing a laser beam onto the marking surface of the article and moving the focal point relatively across the marking surface, a pattern being marked by the laser on the marking surface being based on both a data set and the reference position.

* * * * *